US010381848B2

(12) United States Patent
Lin

(10) Patent No.: US 10,381,848 B2
(45) Date of Patent: Aug. 13, 2019

(54) POWER DEVICE WITH MULTIPLE ELECTRIFYING MODES

(71) Applicant: Ta Hsing Electric Wire & Cable Co., Ltd., Taipei (TW)

(72) Inventor: Chang-Hsin Lin, New Taipei (TW)

(73) Assignee: TA HSING ELECTRIC WIRE & CABLE CO., LTD., Taipei (TW)

( * ) Notice: Subject to any disclaimer, the term of this patent is extended or adjusted under 35 U.S.C. 154(b) by 37 days.

(21) Appl. No.: 15/893,447

(22) Filed: Feb. 9, 2018

(65) Prior Publication Data

US 2018/0205246 A1 Jul. 19, 2018

Related U.S. Application Data

(63) Continuation-in-part of application No. 15/408,427, filed on Jan. 18, 2017, now abandoned.

(51) Int. Cl.

| H02J 7/00 | (2006.01) |
|---|---|
| H02J 7/02 | (2016.01) |
| H02J 50/10 | (2016.01) |
| H04B 5/00 | (2006.01) |
| H01R 27/02 | (2006.01) |
| H01R 107/00 | (2006.01) |
| H01R 103/00 | (2006.01) |

(Continued)

(52) U.S. Cl.
CPC .......... *H02J 7/0042* (2013.01); *H02J 7/0031* (2013.01); *H02J 7/025* (2013.01); *H02J 50/10* (2016.02); *H04B 5/0037* (2013.01); *H01R 24/64* (2013.01); *H01R 27/02* (2013.01); *H01R 31/085* (2013.01); *H01R 2103/00* (2013.01); *H01R 2107/00* (2013.01); *H02J 7/0052* (2013.01); *H02J 2007/0039* (2013.01); *H02J 2007/0059* (2013.01); *H02J 2007/0062* (2013.01)

(58) Field of Classification Search
CPC ........ H02J 7/025; H01F 38/14; Y02T 90/122; B60L 11/182; Y02E 60/12
See application file for complete search history.

(56) References Cited

U.S. PATENT DOCUMENTS

| 2008/0277133 A1* | 11/2008 | Axland | .................. H01R 13/60 |
|---|---|---|---|
| | | | 174/54 |
| 2012/0113645 A1* | 5/2012 | Liao | ...................... H02J 7/0042 |
| | | | 362/253 |

(Continued)

*Primary Examiner* — Arun C Williams
(74) *Attorney, Agent, or Firm* — Guice Patents PLLC

(57) ABSTRACT

A power device with multiple electrifying modes is disclosed. The power device includes a casing, a power wire, a receptacle unit, a connecting port unit, a circuit unit and a wireless charging module. The power wire is coupled to an alternating current power source. The receptacle unit and the connecting port unit are disposed on the casing. The circuit unit is coupled to the power wire, the receptacle unit and the connecting port unit. The circuit unit rectifies the alternating current power source to a direct current power source and provides the connecting port unit with the direct current power source. The circuit unit further provides the receptacle unit with the alternating current power source. The wireless charging module is coupled to the circuit unit. The circuit unit drives the wireless charging module to generate an electromagnetic field, so as to induct an electric potential for power supply.

12 Claims, 5 Drawing Sheets

(51) Int. Cl.
*H01R 24/64* (2011.01)
*H01R 31/08* (2006.01)

(56) References Cited

U.S. PATENT DOCUMENTS

| | | | | |
|---|---|---|---|---|
| 2014/0077759 A1* | 3/2014 | Liao | ................ | H02J 7/0042 320/108 |
| 2014/0098445 A1* | 4/2014 | Hooper | ................ | H02H 3/16 361/42 |
| 2017/0321853 A1* | 11/2017 | Chien | ................ | H02J 7/0027 |

* cited by examiner

POWER DEVICE WITH MULTIPLE ELECTRIFYING MODES

CROSS-REFERENCE TO RELATED APPLICATIONS

This application is a continuation-in-part of and claims priority under 35 U.S.C. § 120 to U.S. application Ser. No. 15/408,427 filed on Jan. 18, 2017.

BACKGROUND OF THE INVENTION

1. Field of the Invention

The present invention relates to a power device, and more particularly, to a power device with multiple electrifying modes.

2. Description of the Prior Art

Generally speaking, a conventional extension cord is coupled to a wall socket, allowing home appliances to be coupled with the wall socket at desired locations, such as a desktop. Furthermore, the conventional extension cord can be equipped with multiple receptacles for multiple home appliances to be plugged with at the desired locations. However, the multiple receptacles on the conventional extension cord are in parallel connection with the wall socket. Thus, the multiple receptacles on the conventional extension cord are only able to provide the home appliances with alternating current for electrifying or charging. As a result, the conventional extension cord is incapable neither of providing current other than the alternating current nor satisfying electrifying and charging demands for various home appliances.

SUMMARY OF THE INVENTION

The present invention provides a power device with multiple electrifying modes for solving above drawbacks.

According to an embodiment of the present invention, a power device with multiple electrifying modes includes a casing, a power wire, at least one receptacle unit, at least one connecting port unit, a circuit unit and a wireless charging module. The power wire is coupled to an alternating current power source. The at least one receptacle unit is disposed on the casing. The at least one connecting port unit is disposed on the casing. The circuit unit is coupled to the power wire, the at least one receptacle unit and the at least one connecting port unit. The circuit unit rectifiers the alternating current power source to a direct current power source and provides the at least one connecting port unit with the direct current power source. The circuit unit further provides the receptacle unit with the alternating current power source. The wireless charging module is coupled to the circuit unit. The circuit unit drives the wireless charging module to generate an electromagnetic field, so as to induct an electric potential for power supply. the periphery portion has a first lateral portion, a second lateral portion and a third lateral portion, the first lateral portion, the second lateral portion and the third lateral portion are connected to one another, the power wire is outgoing from the firs lateral portion, the at least one connecting port unit is disposed on the second lateral portion, and the at least one receptacle unit is disposed on the third lateral portion, a first angle is formed between the first lateral portion and the second lateral portion, a second angle is formed between the first lateral portion and the third lateral portion, a third angle is formed between the second lateral portion and the third lateral portion, a connection of the first lateral portion to the covering portion is curved, a connection of the second lateral portion to the covering portion is curved and a connection of the third lateral portion to the covering portion is curved.

In summary, the circuit unit of the power device of the present invention is able to provide the receptacle unit with the alternating current power source, so that the receptacle unit is coupled to external home appliances in an alternating current manner. The circuit unit of the power device of the present invention is further able to rectifier the alternating current power source to the direct current power source and provide the connecting port unit with the direct current power source, so that the connecting port unit is couple to the external home appliances in a direct current manner. In addition, the power device of the present invention is equipped with the wireless charging module, so as to charge the external home appliances in a wireless manner. In conclusion, the power device of the present invention is able to provide the external electronic devices or home appliances with multiple electrifying modes.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which forma part hereof, and in which is shown by way of illustration specific embodiments in which the invention may be practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
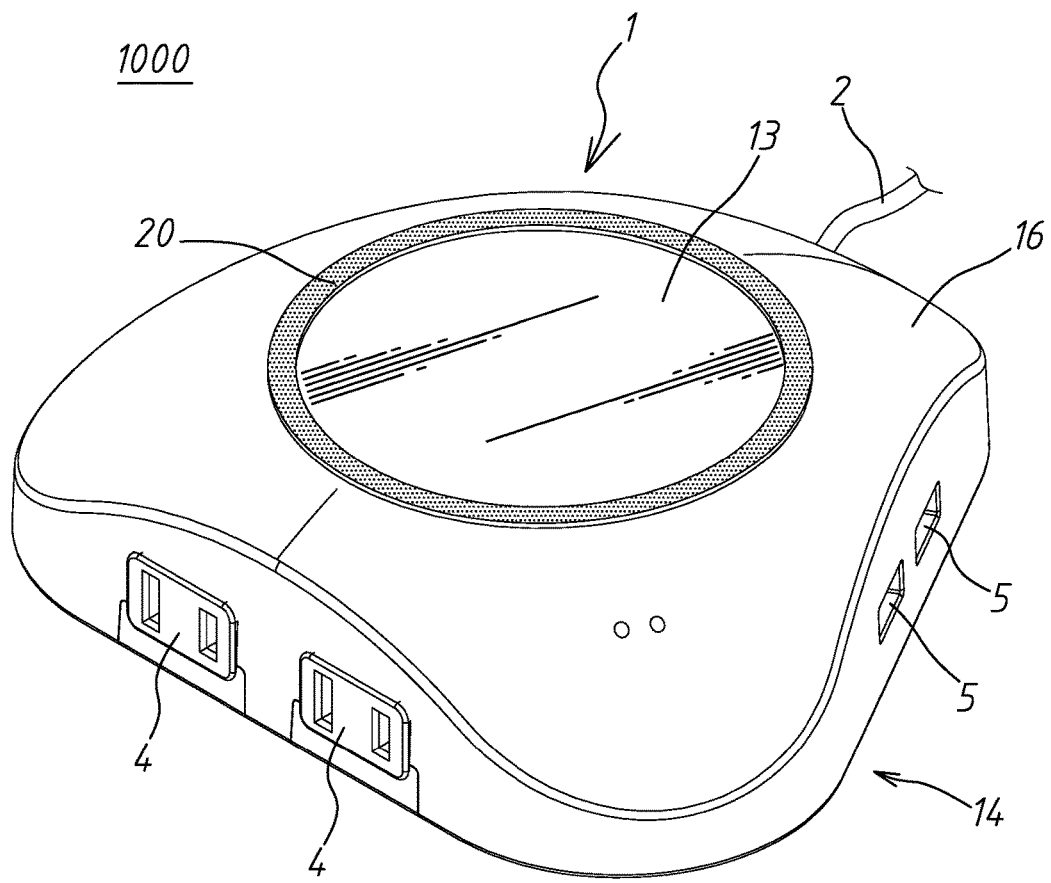
FIG. 1 is a perspective view of a power device according to a first embodiment of the present invention.
Figure 2:
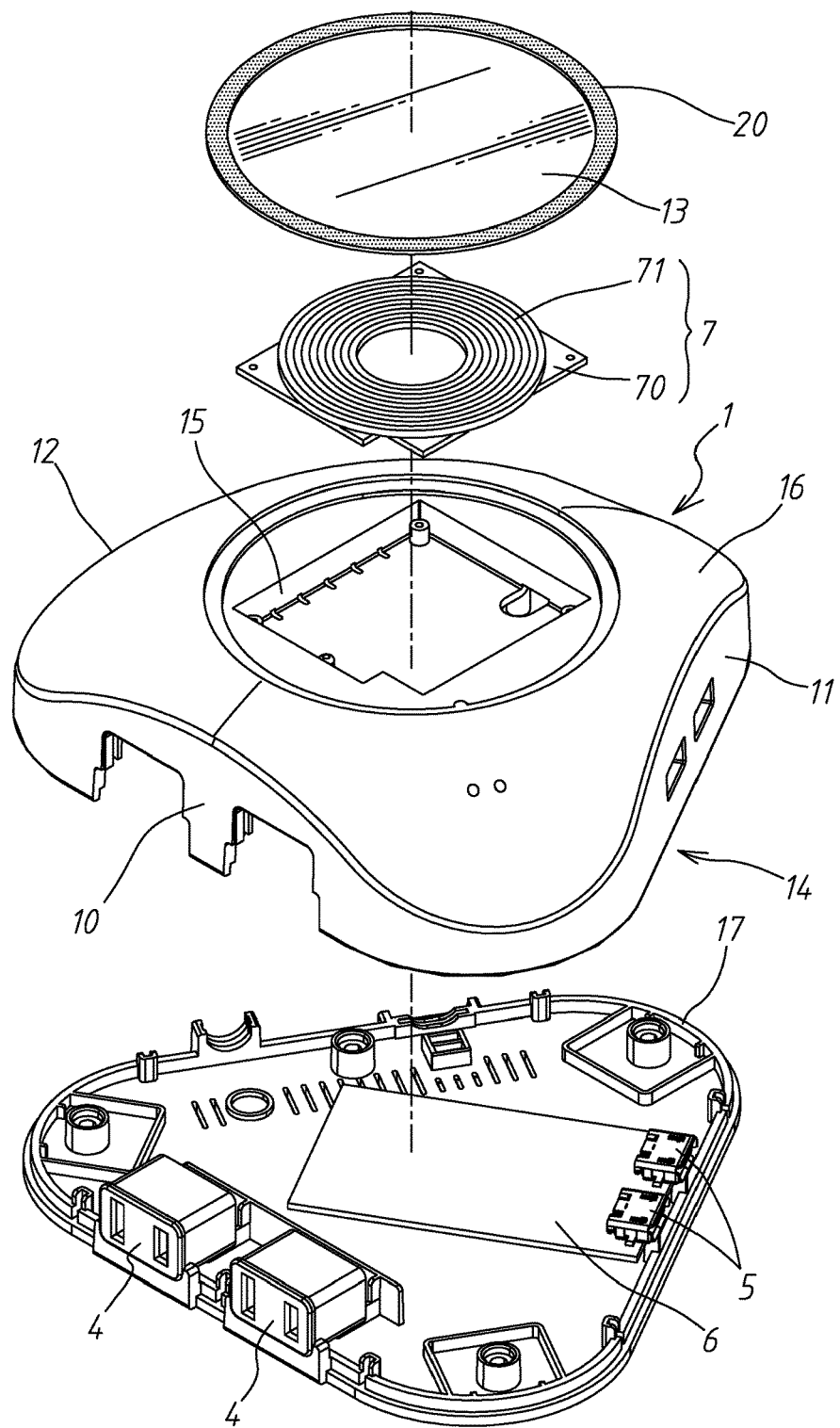
FIG. 2 is an exploded view of the power device according to the first embodiment of the present invention.
Figure 3:
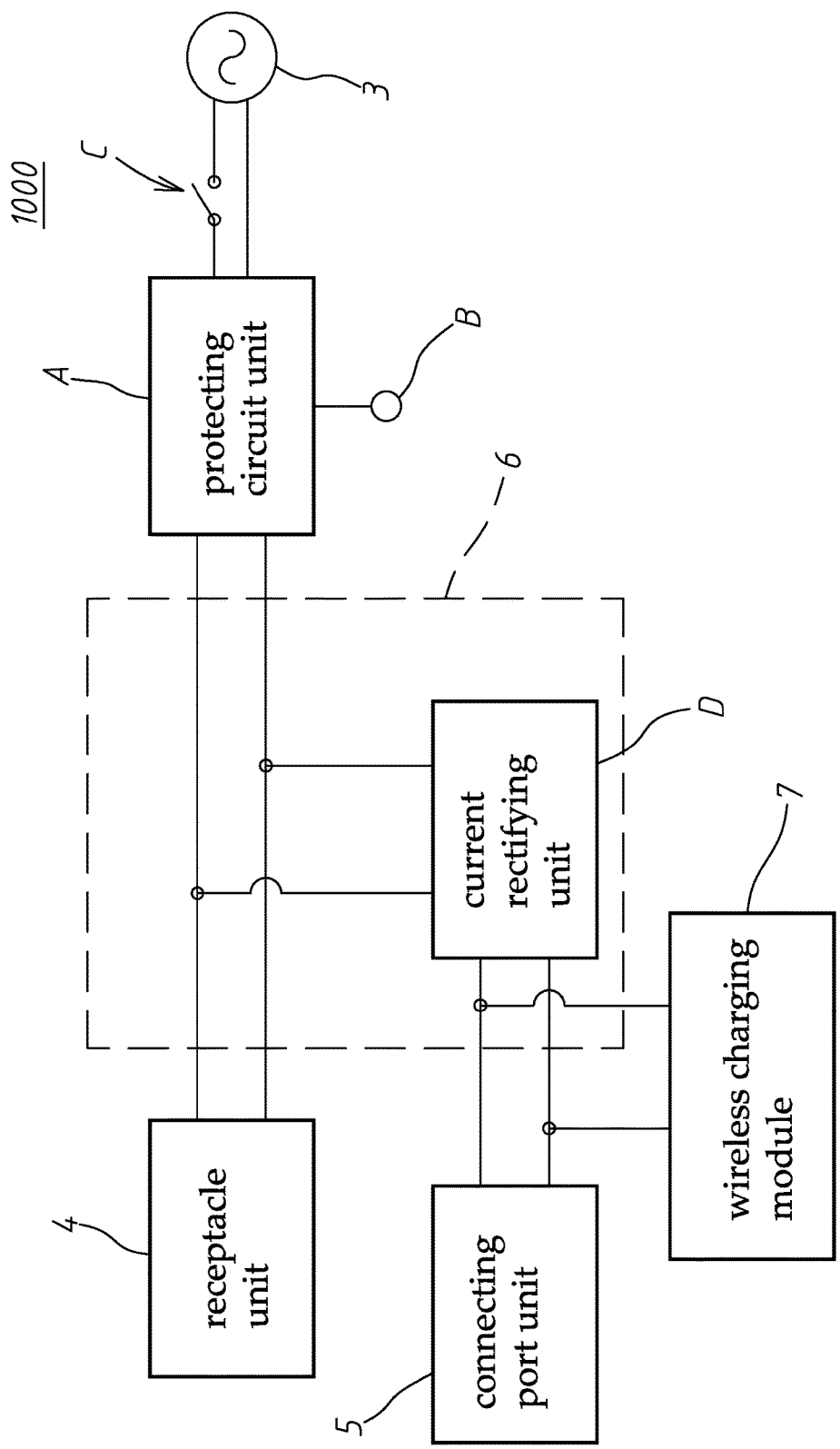
FIG. 3 is a functional block diagram of the power device according to the first embodiment of the present invention.

Please refer to FIG. 1 to FIG. 3. FIG. 1 is a diagram of a power device 1000 according to a first embodiment of the present invention. FIG. 2 is an exploded diagram of the power device 1000 according to the first embodiment of the present invention. FIG. 3 is a functional block diagram of the power device 1000 according to the first embodiment of the present invention. As shown in FIG. 3 to FIG. 3, the power device 1000 includes a casing 1, a power wire 2, two receptacle units 4, two connecting port units 5, a circuit unit 6 and a wireless charging module 7. The power wire 2 is used for coupling to an alternating current power source 3. In practical application, the power wire 2 can be plugged with a wall socket for coupling to the alternating current power source 3. The two receptacle units 4 and the two connecting port units 5 are respectively disposed on the casing 1. The circuit unit 6 is disposed in the casing 1 and coupled to the power wire 2, the two receptacle units 4 and the two connecting port units 5. In practical application, the receptacle units 4 and the connecting port units 5 can be electrically connected to the circuit unit 6 via wires, but the present invention is not limited thereto. For example, the receptacle units 4 and the connecting port units 5 can be welded to a copper first, and then electrically connected to the circuit unit 6 via the copper. As for which one of the above-mentioned designs is adopted, it depends on practical demands.

Furthermore, the wireless charging module 7 is disposed in the casing 1 and includes a wireless charging circuit 70 and a wireless charging transmitting means 71. The wireless charging circuit 70 is electrically connected to the circuit unit 6, and the wireless charging transmitting means 71 is electrically connected to the wireless charging circuit 70. Accordingly, the wireless charging module 7 is coupled to the circuit unit 6, so that the circuit unit 6 drives the wireless charging module 7 to generate an electromagnetic field, so as to induct an electric potential for power supply. In practical application, the wireless charging transmitting means 71 can be a wireless charging coil, but the present invention is not limited thereto. In addition, the power device 1000 further includes a protecting circuit unit A, a reset unit B, a power switch unit C and a current rectifying unit D. The protecting circuit unit A is coupled to the circuit unit 6 and the alternating current power source 3. When a voltage or a current which is provided by the alternating current power source 3 to the circuit unit 6 reaches a threshold value, the protecting circuit unit A forms an open circuit for protecting the circuit unit 6. In practical application, the protecting circuit unit A can be an Over Voltage Protection (OVP) circuit or an Over Current Protection (OCP) circuit. Which one of the above-mentioned designs is adopted, it depends on practical demands.

Furthermore, the reset unit B is coupled to the protecting circuit unit A. When the protecting circuit unit A detects the threshold value and forms the open circuit, the reset unit B resets the protecting circuit unit A for initializing the protecting circuit unit A, so that the power device 1000 is normally operated. The power switch unit C is coupled to the protecting circuit unit A and the alternating current power source 3. The power switch unit C is for electrically connecting the alternating current power source 3 with the protecting circuit unit A. For example, when the power switch unit C is in a turn-on status, the power switch unit C electrically connects the alternating current power source 3 with the protecting circuit unit A, so that the alternating current power source 3 is coupled to the circuit unit 6 via the protecting circuit unit A. Accordingly, the power device 1000 is normally operated. On the other hand, when the power switch unit C is in a turn-off status, the power switch unit C disconnects the alternating current power source 3 from the protecting circuit unit A, so that the alternating current power source 3 is not coupled to the circuit unit 6 via the protecting circuit unit A. Accordingly, the power device 1000 is turned off. Furthermore, the current rectifying unit D is coupled to the circuit unit 6, and electrically connected to the connecting port units 5 and the wireless charging circuit 70 of the wireless charging module 7. The current rectifying unit D rectifiers the alternating current power source 3 into a direct current power source and provides the connecting port units 5 and the wireless charging module 7 with the direct current power source.

Figure 4:
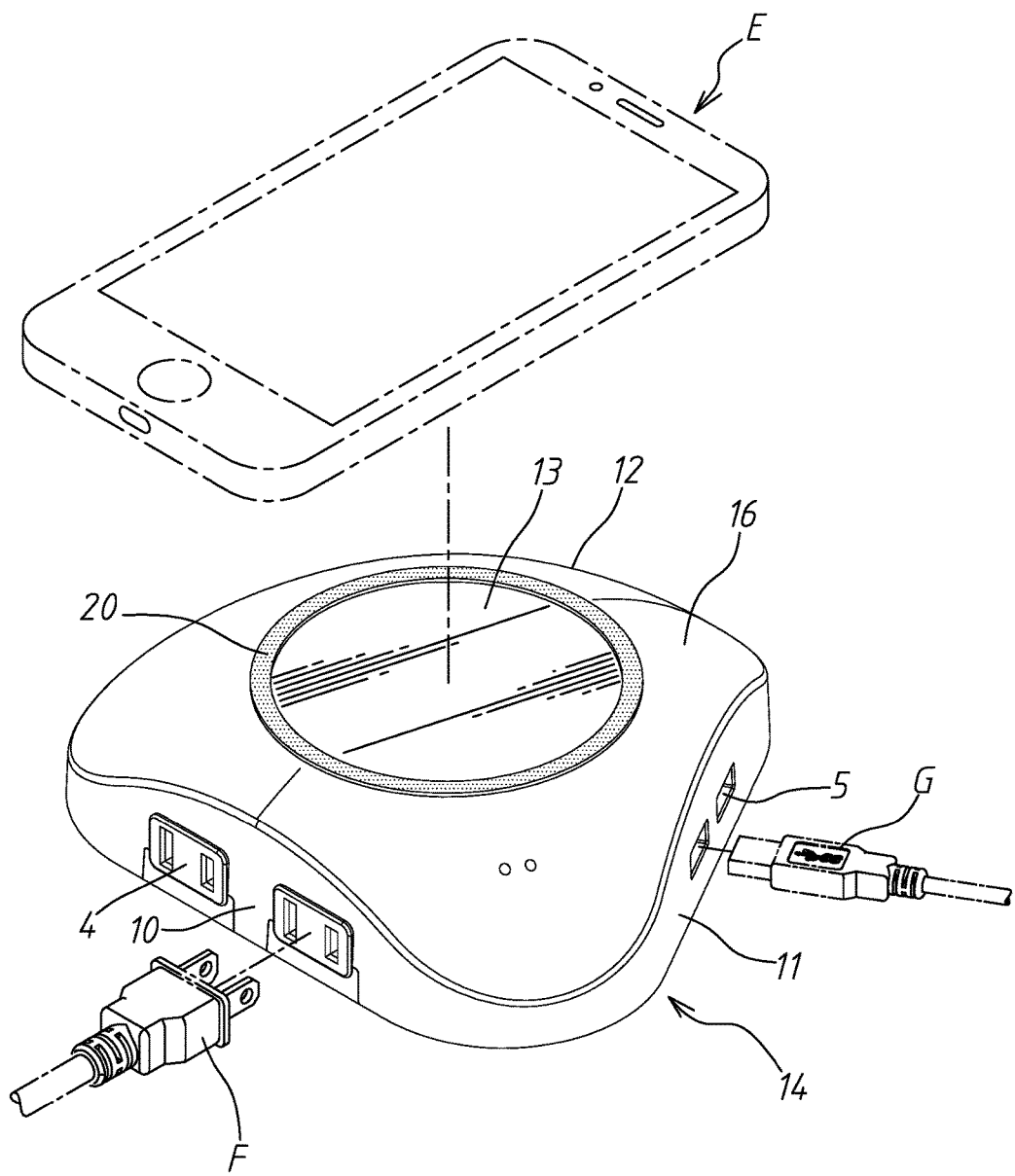
FIG. 4 is a schematic view of the power device in a usage status according to the first embodiment of the present invention.

Descriptions for working principles of the power device 1000 is provides as follows. Please refer to FIG. 1 to FIG. 4. FIG. 4 is a diagram of the power device 1000 in a usage status according to the first embodiment of the present invention. As shown in FIG. 1 to FIG. 4, when the power device 1000 is utilized for charging an electronic device E (e.g., a cell phone) in a wireless manner, the power wire 2 is coupled to the alternating current power source 3. Meanwhile, the circuit unit 6 of the power device 1000 electrically connects the alternating current power source 3 with the wireless charging transmitting means 71 via the wireless charging circuit 70, so that the wireless charging transmitting means 71 is charged by the current rectifying unit D for generating the time-varying electromagnetic field, so as to induce a charging current inside the electronic device E in a wireless manner. Meanwhile, a plug F is able to be further plugged with the receptacle units 4 of the power device 1000. Accordingly, the power device 1000 provides another electronic device (e.g., a desktop computer, a notebook computer) with the alternating current power source 3 via the receptacle units 4 and the plug F. Alternatively, a connector G is able to be further mated with the connecting port units 5 of the power device 1000. Accordingly, the power device 1000 rectifiers the alternating current power source 3 into the direct current power source by the current rectifying unit D and provides the other electronic device (e.g., an external hardware drive, a mobile power supply, a small USB fan or a USB lamp) with the direct current power source via the connecting port units 5 and the connector G.

It should be noticed that, in this embodiment, the current rectifying unit D is only coupled with the circuit unit 6, i.e., there is no current rectifying unit coupled with the wireless charging circuit 70. As a result, the size of the wireless charging circuit 70 can be reduced due to removal of the current rectifying unit D, which results in decrease of size of the power device 1000.

In summary, the circuit unit 6 of the power device 1000 of the present invention is able to provide the receptacle units 4 with the alternating current power source 3, so that the receptacle units 4 are coupled to external home appliances in an alternating current manner. The circuit unit 6 of the power device 1000 of the present invention is further able to rectifier the alternating current power source 3 to the direct current power source via the current rectifying unit D, and provides the connecting port units 5 with the direct current power source, so that the connecting port units 5 are couple to the external home appliances in a direct current manner. In addition, the power device 1000 of the present invention is equipped with the wireless charging module 7 which is coupled to the circuit unit 6, so as to charge the external home appliances in a wireless manner. In conclusion, the power device 1000 of the present invention is able to provide the external electronic devices or home appliances with multiple electrifying modes.

In this embodiment, the casing 1 is a substantially triangular structure. The casing 1 (i.e., the triangular structure) has a first lateral portion 10, a second lateral portion 11 and a third lateral portion 12, a covering portion 16 and a base 17. The first lateral portion 10, the second lateral portion 11 and the third lateral portion 12 are connected with one another. The power wire 2 is outgoing from the third lateral portion 12. The connecting port units 5 is disposed on the second lateral portion 11, and the receptacle units 4 is disposed on the first lateral portion 10. In addition. A first angle is formed between the first lateral portion 10 and the second lateral portion 11, a second angle is formed between the first lateral portion 10 and the third lateral portion 12, a third angle is formed between the second lateral portion 11 and the third lateral portion 12. A connection of the first lateral portion 10 to the covering portion 16 is curved, a connection of the second lateral portion 11 to the covering portion 16 is curved and a connection of the third lateral portion 12 to the covering portion 16 is curved. Since the casing 1 of this embodiment is equilateral triangle, the first angle, the second angle and the third angle are equal and they are equal to 60°. An accommodating portion 15 is formed on the covering portion 16. The top portion 13 attachably covers the accommodating portion 15. The wireless charging transmitting means 71 of the wireless charging module 7 is attached to a top portion 13. The top portion 13 can be a platform which is for holding the electronic device E and includes an anti-slip pad 20 which is annular. Accordingly, when the electronic device E is placed on the top portion 13, the electronic device E is positioned by the anti-slip pad 20. When the electronic device E is placed on the top portion 13, the wireless charging transmitting means 71 is able to induce the electronic device E for charging the electronic device E in a wireless manner. It should be noticed that a thickness of the top portion 13 is smaller than a thickness of the peripheral portion 14. Practically, the thickness of the top portion 13 of the casing 1 is 1 mm, and the thickness of the peripheral portion 14 of the casing 1 is 2 mm. Accordingly, a distance between the wireless charging transmitting means 71 and the electronic device E can be reduced, so that the wireless charging transmitting means 71 is able to induce the electronic device E in a more effective way.

In this embodiment, the casing 1 can include a base 17. The base 17 is jointed to the peripheral portion 14. The base 17 bears the the receptacle units 4, connecting port units 5 and the circuit unit 6. Three anti-slip pads are disposed on the bottom of the base 17. When the case 1 is placed on a table, the anti-slip pads prevent the sliding of the case 1. The base 17 can be sccewed to the peripheral portion 14. The housing 16 has the top portion 13 and the peripheral portion 14. Furthermore, in this embodiment, the connecting port units 5 can be a Universal Serial Bus (USB) connector.

It should be noticed that the power device 1000' includes three receptacle units 4, wherein two receptacle units 4 with three holes are disposed on the top portion 13 of the casing 1', and one the receptacle unit 4 with two holes is disposed on the third lateral portion 12 of the casing 1'. In another embodiment, the one receptacle unit 4 with two holes is able to be disposed on the fourth lateral portion 15 of the casing 1' as well. In other words, structures that the receptacle units 4 are selectively disposed on at least one of the top portion 13, the third lateral portion 12 and the fourth lateral portion 15 of the casing 1' are within the scope of the present invention.

Figure 5:
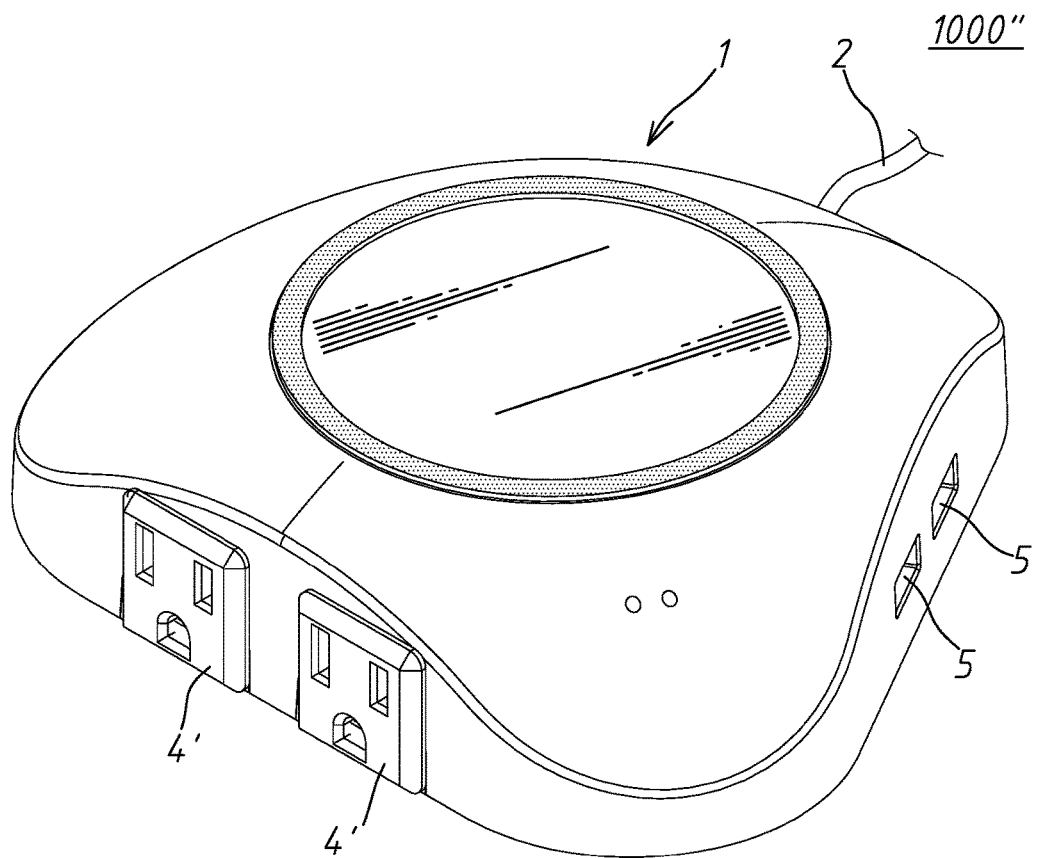
FIG. 5 is a perspective view of a power device according to a second embodiment of the present invention.

Please refer to FIG. 5. FIG. 5 is a diagram of a power device 1000" according to another embodiment of the present invention. As shown in FIG. 5, the major difference between the power device 1000" and the aforesaid the power device 1000 is that the receptacle unit 4' has three holes such as a socket of NEMA 5-15 or NEMA 5-20.

Compared to the prior art, the circuit unit of the power device of the present invention is able to provide the receptacle unit with the alternating current power source, so that the receptacle unit is coupled to external home appliances in an alternating current manner. The circuit unit of the power device of the present invention is further able to rectifier the alternating current power source to the direct current power source and provide the connecting port unit with the direct current power source, so that the connecting port unit is couple to the external home appliances in a direct current manner. In addition, the power device of the present invention is equipped with the wireless charging module, so as to charge the external home appliances in a wireless manner. In conclusion, the power device of the present invention is able to provide the external electronic devices or home appliances with multiple electrifying modes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power device with multiple electrifying modes, comprising:
    a casing having a covering portion and a peripheral portion, wherein the periphery portion is connected to the covering portion and encloses the covering portion;
    a power wire coupled to an alternating current power source;
    at least one receptacle unit disposed on the casing;
    at least one connecting port unit disposed on the casing;
    a circuit unit coupled to the power wire, the at least one receptacle unit and the at least one connecting port unit, the circuit unit rectifying the alternating current power source to a direct current power source and providing the at least one connecting port unit with the direct current power source, the circuit unit further providing the receptacle unit with the alternating current power source; and
    a wireless charging module coupled to the circuit unit, the circuit unit driving the wireless charging module to generate an electromagnetic field, so as to induct an electric potential for power supply, wherein the periphery portion has a first lateral portion, a second lateral portion and a third lateral portion, the first lateral portion, the second lateral portion and the third lateral portion are connected to one another, the power wire is outgoing from the firs lateral portion, the at least one connecting port unit is disposed on the second lateral portion, and the at least one receptacle unit is disposed on the third lateral portion, a first angle is formed between the first lateral portion and the second lateral portion, a second angle is formed between the first lateral portion and the third lateral portion, a third angle is formed between the second lateral portion and the third lateral portion, a connection of the first lateral portion to the covering portion is curved, a connection of the second lateral portion to the covering portion is curved and a connection of the third lateral portion to the covering portion is curved.

2. The power device of claim 1, wherein the wireless charging module is disposed inside the casing and comprises:
   a wireless charging circuit electrically connected to the circuit unit; and
   a wireless charging transmitting means electrically connected to the wireless charging circuit.

3. The power device of claim 1, wherein the casing further has a top portion, the top portion is connected to the covering portion, and the wireless charging transmitting means is attached to the top portion.

4. The power device of claim 3, wherein a thickness of the top portion is smaller than a thickness of the peripheral portion.

5. The power device of claim 3, wherein an accommodating portion is formed on the covering portion, the top portion covers the accommodating portion, and the wireless charging module is accommodated in the accommodating portion.

6. The power device of claim 3, further comprising a anti-slip pad disposed on the top portion.

7. The power device of claim 1, wherein the casing comprises:
   a housing having a top portion, the peripheral portion being connected to the top portion, the wireless charging transmitting means being attached to the top portion; and
   a base combined with the peripheral portion, so that the base and the housing cooperatively cover the circuit unit and the wireless charging module.

8. The power device of claim 1, wherein the wireless charging module is disposed outside the casing and comprises:
   a wireless charging casing detachably installed on the casing;
   a wireless charging circuit disposed inside the wireless charging casing; and
   a wireless charging transmitting means disposed inside the wireless charging casing and electrically connected to the wireless charging circuit.

9. The power device of claim 1, further comprising:
   a protecting circuit unit coupled to the circuit unit and the alternating current power source, the protecting circuit unit forming an open circuit when a threshold value is detected; and
   a reset unit coupled to the protecting circuit unit and for resetting the protecting circuit unit.

10. The power device of claim 9, further comprising:
    a power switch unit coupled to the protecting circuit unit and the alternating current power source, the power switch unit being for electrically connecting the alternating current power source with the protecting circuit unit.

11. The power device of claim 1, wherein the circuit unit comprises a current rectifying unit configured to convert alternating current into direct current.

12. The power device of claim 11, wherein the connecting port and the wireless charging module are coupled to the current rectifying unit.

\* \* \* \* \*